INVENTORS
JAMES I. CHANDLER
CHARLES C. ROE
BY
John F. Schmidt

July 22, 1958  J. I. CHANDLER ET AL  2,844,783
FIELD CURRENT SUPPLY SYSTEM FOR AN ALTERNATOR
Filed June 9, 1955  6 Sheets-Sheet 4

INVENTORS
JAMES I. CHANDLER
CHARLES C. ROE
BY
John F. Schmidt

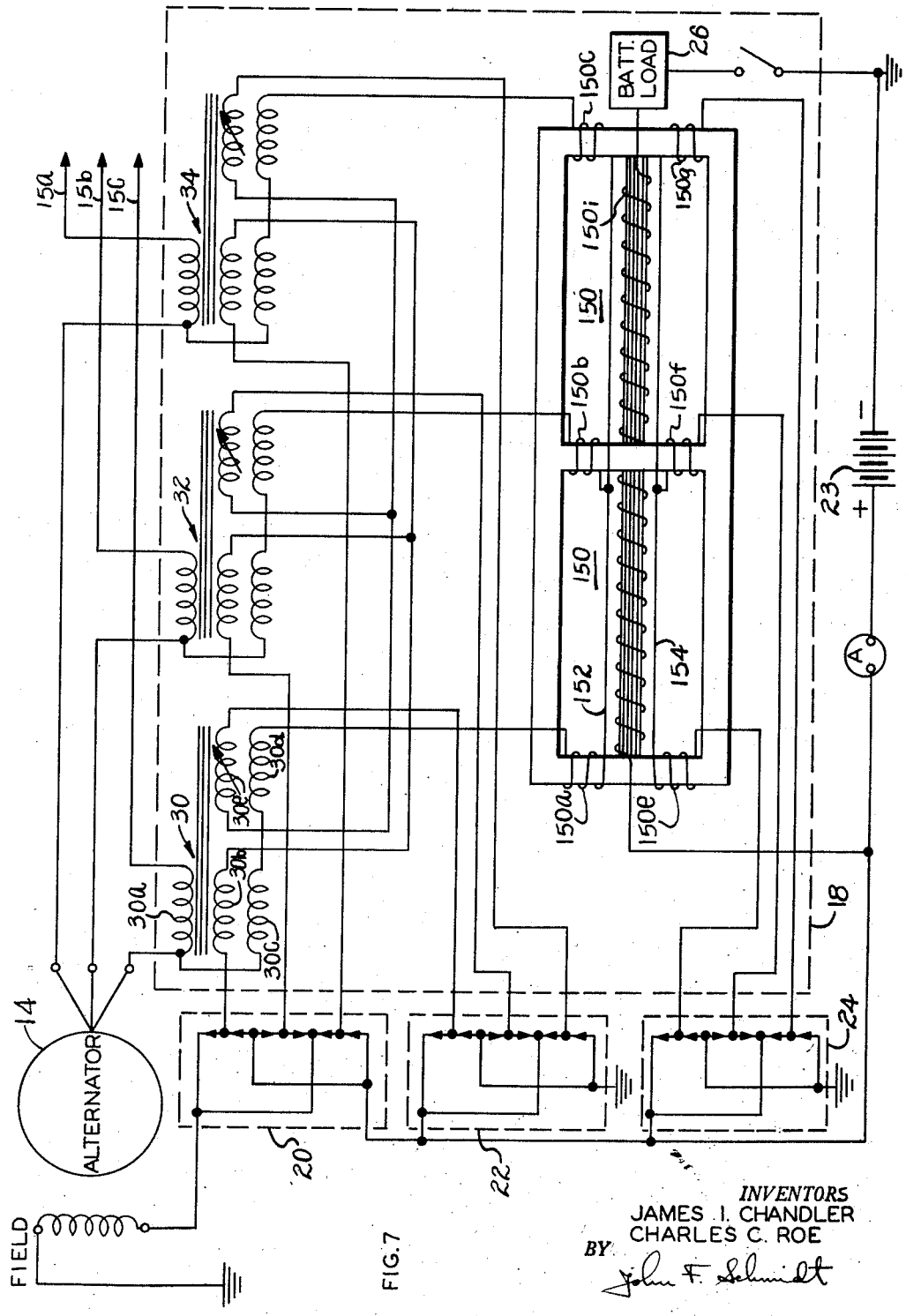

July 22, 1958  J. I. CHANDLER ET AL  2,844,783
FIELD CURRENT SUPPLY SYSTEM FOR AN ALTERNATOR
Filed June 9, 1955
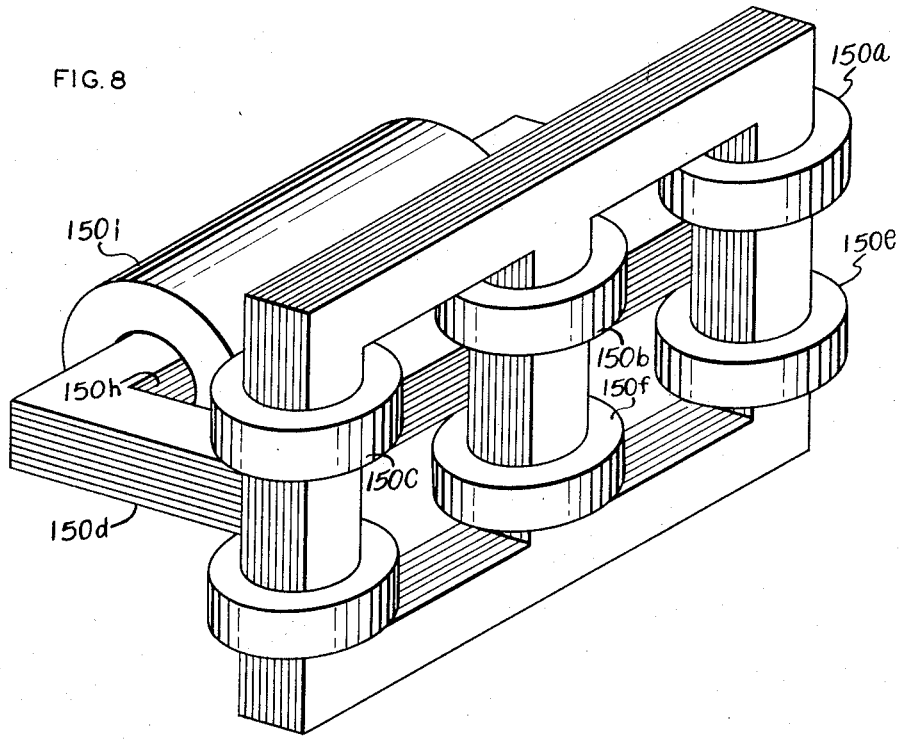
INVENTORS
JAMES I. CHANDLER
BY CHARLES C. ROE

United States Patent Office 2,844,783
Patented July 22, 1958

2,844,783

FIELD CURRENT SUPPLY SYSTEM FOR AN ALTERNATOR

James I. Chandler, Metamora, and Charles C. Roe, Peoria, Ill., assignors to LeTourneau-Westinghouse Company, Peoria, Ill., a corporation of Illinois Application June 9, 1955, Serial No. 514,184

19 Claims. (Cl. 322—27)

Our invention relates to an improved field current supply system for an alternator.

In certain A.-C. generator or alternator applications it is desirable to maintain the ratio of terminal voltage to frequency at an approximately constant value over a variety of operating speeds, load currents, and load power factors. This operation is useful, for example, in alternators located on tractors, where the major load consists of hoist-type induction motors used to lift scraper or bulldozer blades, steer, operate dumping devices, etc. To achieve approximately constant maximum torque and constant heat loss in such motors at varying frequencies, the terminal voltage should be increased approximately in proportion to the speed, and hence frequency. This voltage characteristic is also useful when the alternator is used for dynamic braking as the rising voltage curve serves to give a sharply increasing brake horsepower characteristic as distinguished from the approximately constant horsepower (and hence drooping torque) characteristic which would result from constant voltage regulation at varying speeds. Additionally, in such installations it is desirable to provide an alternator field current supply system which permits the alternator to be operated as a synchronous motor from an external power source, or generator operation in parallel with other generators to feed a common load, all at reasonably high power factor.

In accordance with the present invention an improved apparatus is provided to obtain an approximately constant volts per cycle output at the alternator output terminals. In brief, the field winding of the alternator is energized from a battery in conjunction with the D.-C. side of a series-connected rectifier which serves as a booster. The A.-C. side of the rectifier is fed from the secondary of a power transformer having a main primary winding and a reference primary winding. The main primary winding is connected in the alternator load circuit and the reference primary winding is connected between the alternator output terminal and a point of neutral potential through the primary of a flux bridge transformer. Under no-load conditions the battery serves to supply field current flow sufficient to maintain the desired volts per cycle terminal voltage. The current drawn through the reference primary of the transformer serves in this condition to supply conditioning A.-C. voltage to the rectifier. The amount of this voltage is sufficient to compensate for the D.-C. rectifier voltage drop and thus assures that any increased A.-C. rectified voltage will appear immediately as D.-C. rectified voltage to increase the alternator field current.

In the apparatus herein described, the no-load current flow through the reference primary of the transformer additionally serves as a phase sensing current flow. This current is through a highly inductive circuit to lag in relation to the unity power factor load current through the first primary. The M. M. F.'s of the respective primary currents add vectorially to produce an A.-C. secondary voltage determined by their resultant. At unity power factor, the resulting field current boost is considerably less than that determined by the algebraic sum of the respective primary currents. However, if the alternator load current has a low lagging power factor—such as the 0.6 power factor typical of hoist type induction motor operation—the current flow through the reference primary winding is approximately in phase with the line or load current flow. In this instance, the M. M. F.'s due to the two primaries add almost directly to produce a greater transformer flux, A.-C. secondary voltage, and field current flow than that at unity power factor load with the same load current. By this action the reference primary winding provides load power factor compensation to give a substantially constant volts per cycle output voltage despite load power factor changes. It thus serves to compensate for the physical fact that the alternator field current necessary at lagging power factor is greater than required for the same load current at unity power factor.

The apparatus herein described further serves to maintain the battery charge over the wide variations in alternator field current and other varying battery loads. This is accomplished by the dual action of a battery charging rectifier, energized in a manner similar to the main field booster rectifier, and a no-load battery charging rectifier which compensates for no-load field current and miscellaneous battery drain. The latter rectifier is energized from the same transformer that serves to provide lagging current flow in the reference primary windings for the other two rectifiers. This transformer is of the flux bridge type to give approximately constant battery charging current flow despite alternator frequency and voltage variations.

When the alternator supplied with field excitation from the apparatus described herein is operated as a synchronous motor, the phase of the current flow through the main primary winding to the field current booster rectifier (and the corresponding battery charging rectifier) is reversed. The system under this condition of operation has been found to operate effectively and at a field current giving comparatively good power factor.

It is therefore a general object of the present invention to provide an improved field current supply system for an alternator.

More specifically it is an object of the present invention to provide an improved field current supply system capable of maintaining a substantially constant volts per cycle voltage output over a predetermined range of load currents, load power factors, and frequencies.

Additionally, it is an object of the present invention to provide an improved battery energized field current supply system for an alternator which serves to maintain the battery charge over the varying field currents required for approximately constant volts per cycle alternator output.

Yet another object of the present invention is to provide an improved field current supply system capable of achieving the operation set forth above and yet deriving power from the A.-C. alternator output through static non-electronic devices.

Additionally, it is an object of the present invention to provide a field current supply system of the above type which uses a battery to provide initial field current and to stabilize operation and yet maintains the charge on the battery effectively.

An additional object of the present invention is to provide an alternator field current supply system in which reference current flow serves to maintain the booster rectifier in a conditioned state under no-load conditions and to which the load current responsive current flow is vectorially added to provide alternator field current flow responsive to both the load current and load power factor both at low load values and high load values.

Further it is an object of the present invention to provide an improved field current supply system for an alternator which serves to excite the alternator for high power factor synchronous motor operation from an external source of power.

Additionally it is an object of the present invention to provide an improved alternator field current supply system which effectively uses the currents and voltages available in a balanced three phase system to provide load power factor compensation and efficient rectifier operation.

Still another object of the present invention is to provide an improved alternator field current supply system in which a common transformer serves to provide no-load battery charging current and a reactance load for the reference primary windings of the main field current supply transformer.

It is yet another object of the present invention to provide an alternator field current supply system which embodies features of construction, combination and arrangement rendering it comparatively inexpensive to manufacture, highly reliable, easily adjusted, and not requiring manual adjustments during normal operation, to the end that a system especially suitable for earth moving vehicles and like applications is provided.

The novel features of our invention are set forth with particularity in the appended claims. Our invention itself, however, both as to its organization and method of operation, together with further objects and advantages thereof, will best be understood by reference to the following description taken in connection with the accompanying drawings, in which:

Figure 2:
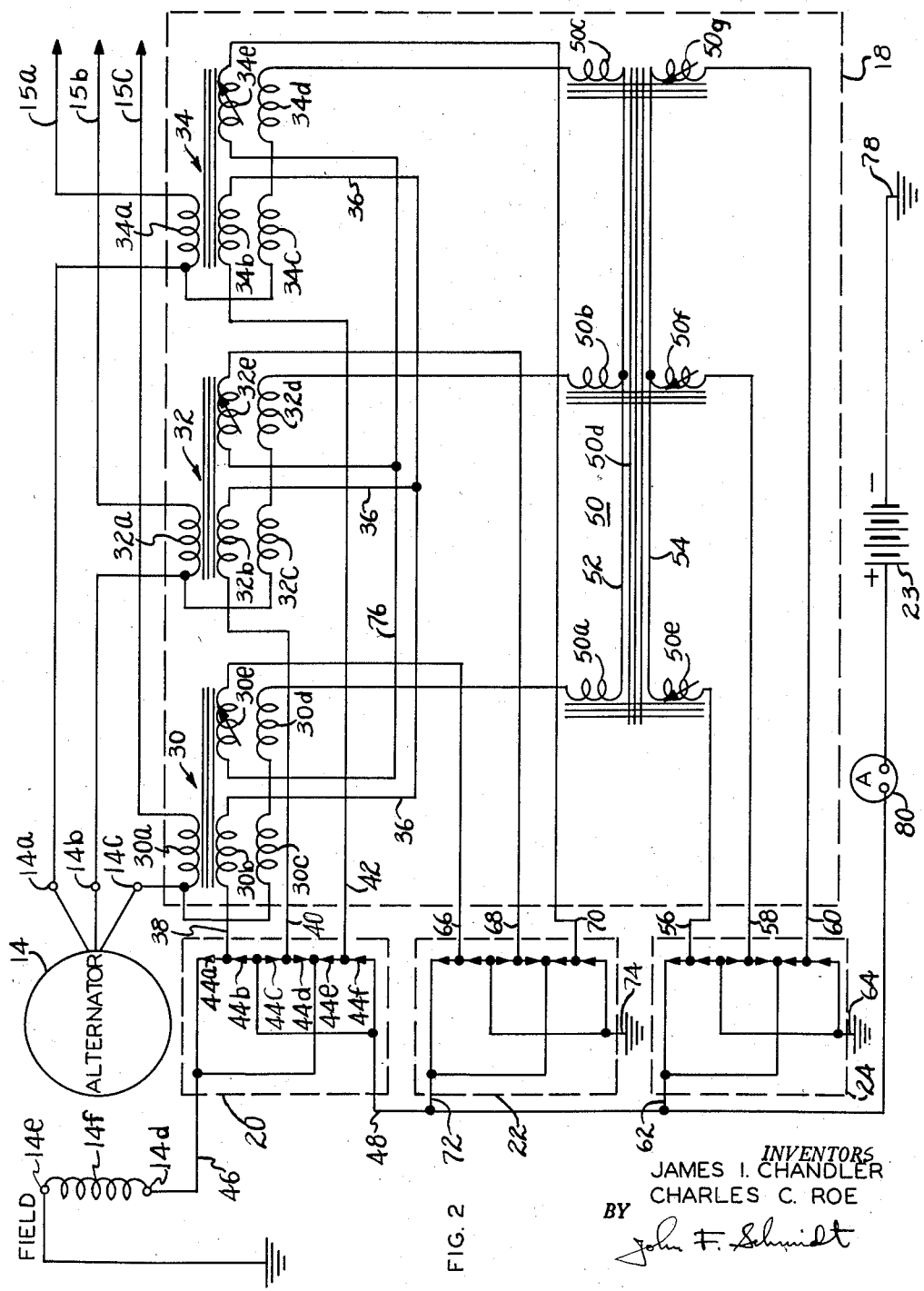
Figure 2 is a detailed circuit diagram of one form of the system of the present invention.
Figure 5:
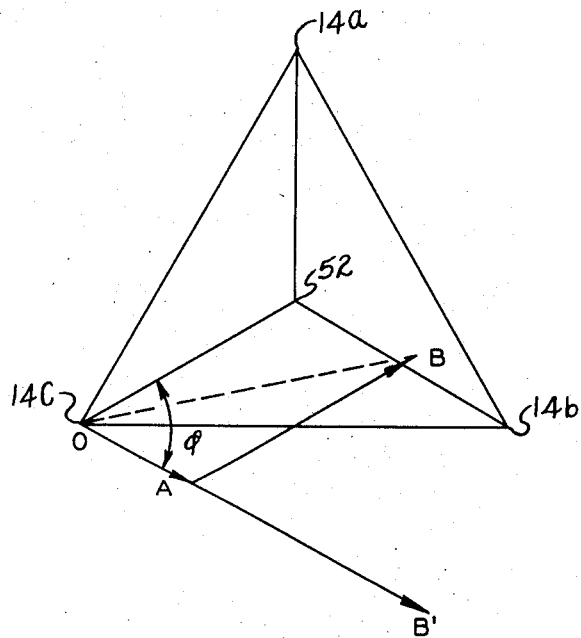
Figure 6A:
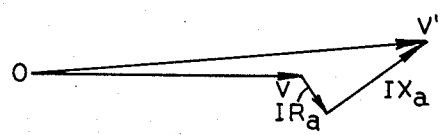
Figure 6B:
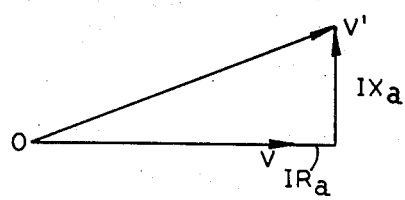

Figure 5 is a vector diagram showing how the main and reference winding M. M. F.'s of the rectifier energizing transformers combine under varying load power factor conditions;

Figures 6a and 6b are vector diagrams showing how excitation voltage and terminal voltage of an alternator change with load power factor;

Figure 7 is a circuit diagram like Figure 2 but showing an alternative form of the present invention; and Figure 8 is a view in perspective of the flux bridge transformer used in the circuit of Figure 7.

THE OVERALL ELECTRIC SYSTEM

Figure 1:
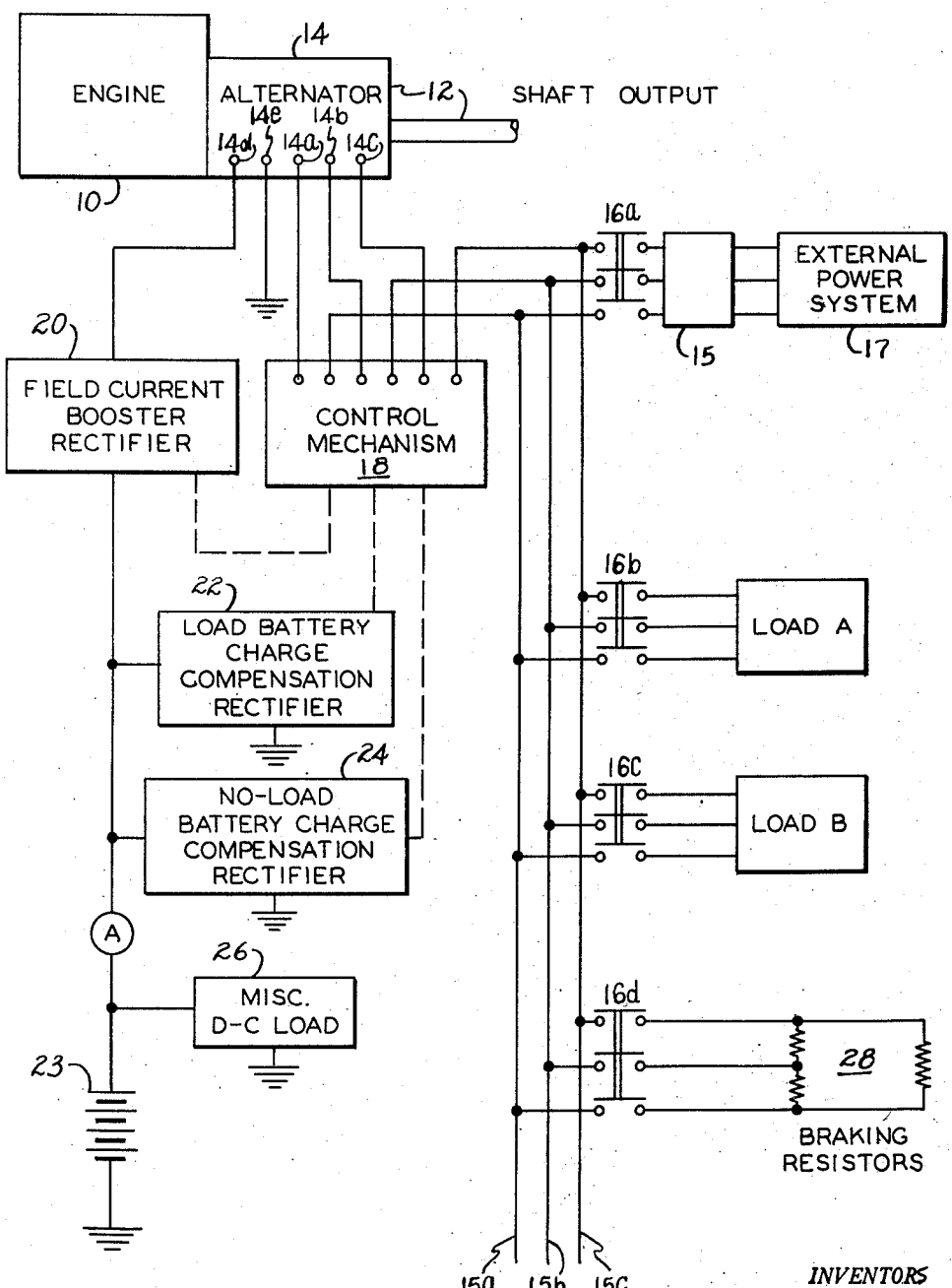
Figure 1 is a diagrammatic view of a complete system of the type to which the present invention is applicable and showing in schematic fashion the components of the system of the present invention.

Figure 1 shows in diagrammatic form an overall electric system to which the mechanism of the present invention is particularly applicable. This system may, for example, be the electrical system of a vehicle for earth moving purposes, such as, for example, a rock or earth carrying truck, a bulldozer, crane, or the like. The engine indicated at 10, Figure 1, may, for example, be a diesel engine. In an earth moving vehicle its main purpose is to develop torque on shaft 12 for transmission through suitable mechanical couplings (not shown) to the wheels of the tractor portion of the device to propel the same as desired. The alternator indicated generally at 14 has its rotor mounted on the engine output shaft 12 and its stator affixed to the engine frame as shown diagrammatically in Figure 1.

Typically, the alternator 14 has a set of three-phase balanced armature windings in the stator. Terminals 14a, 14b and 14c connect to these three-phase windings to provide the power output voltage for the purposes hereinafter set forth. The rotor of alternator 14 may, for example, be a round rotor having longiudinal slots to receive the D.-C. excitation windings (14f, Figure 2) which magnetize the rotor in a plurality of poles. These may, for example, be 8 poles so that at 1800 R. P. M. the frequency of the polyphase voltages induced across the output terminals 14a, 14b and 14c is 120 cycles. The terminals 14d and 14e are connected to the rotor windings through suitable slip rings (not shown) in conventional fashion to permit application of external D.-C. power to the field for excitation purposes.

The output terminals 14a, 14b and 14c of the alternator 14 are selectively connected to various loads or energy sources through the contactors indicated at 16a, 16b, 16c and 16d. With reference to the contactor 16a, it may connect the alternator armature to an external source of polyphase alternating voltage indicated at 17. This source feeds electrical energy through contactor 16a to the armature and thereby drives the alternator 14 as a synchronous motor. This operation may be desirable to propel the tractor through shaft 12 in the event of engine failure or where the cost of fuel in relation to the cost of electrical power is such that propulsion of this kind is economically desirable. The rotor of alternator 14 is preferably provided with pole face windings to provide induction motor type starting upon application of external power and to promote system stability when alternator 14 operates as a motor or in parallel with other alternating current generators.

The connection with contactor 16a is made through a suitable plug-in receptacle 15 for convenience in connecting to an external power source. In an alternative operation of the unit, the plug-in connections may be made to a polyphase electrical system to which power is desired to be fed from the alternator 14. In this instance closure of contactor 16a will form the outgoing power circuit and engine 10 will then feed energy in electrical form to the external circuit.

The contactors 16b and 16c, Figure 1, connect to electrical circuits feeding loads on the vehicle. Such loads may, for example, be motors used to perform various functions. In practical vehicle constructions, these motors are for the most part hoist type high slip or high resistance rotor squirrel cage induction motors. Such motors are characterized by a high degree of reliability because commutators are unnecessary. They are further characterized by small size and comparatively low cost. In an earth moving vehicle such motors may serve to raise and lower a bulldozer blade; lift a scraper up and down as required for scraping operations; lift a tiltable earth-containing body to dump the contents thereof; or rotate a two wheel tractor about its vertical pivotal connection with the trailer of the vehicle for steering purposes. By selectively closing the various contactors to the motors provided, the operator can energize them selectively from the alternator 14 as desired.

One of the characteristics of induction motors is the fact that for predetermined current flow—hence torque and heating—at given frequency, the voltage should be approximately in proportion to the frequency. In other words, the motor which is developing a predetermined torque and temperature rise at, say, 60 cycles frequency must be energized with approximately twice the voltage to develop like torque and temperature rise at 120 cycles. Of course, the above figures presuppose an identical percentage of slip at the two different frequencies and two different synchronous speeds. While the slip cannot be expected to remain constant, and the motor characteristics necessarily depart from the theoretical ideal, it is nevertheless true that for practical purposes the output voltage of the alternator 14 should be nearly in proportion to frequency in order most effectively to feed power to induction motor loads over a substantial frequency range.

In the system of Figure 1, shaft 12 necessarily rotates at varying speeds because the propulsion requirements of the tractor require such varying speeds and for the additional reason that a gasoline or diesel engine is capable of producing high horsepower output only by increasing the speed of rotation. For this reason the electrical system must accommodate the speed and consequent frequency changes. In order to accomplish this the control mechanism indicated generally at 18 is provided as hereinafter described in detail. In brief, this control mechanism senses the current and voltage on the generator 14 to vary the voltage across terminals 14d and 14e—and hence the field current—by the action of the booster rectifier indicated generally at 20. This rectifier adds to the voltage of the battery 23 to cause the A.-C. output voltage of generator 14 to vary in substantially direct proportion to frequency. Additionally, the control mechanism 18 senses load current and power factor to provide the field current flow necessary to compensate for the voltage-varying effects of load current at the various load power factors. This is important because induction motors are characterized by low lagging power factor which entails considerably increased alternator field current flow to maintain desired terminal voltage.

The control mechanism 18 additionally feeds controlled A.-C. power to the load battery charge compensation rectifier 22 which has for its main purpose the charging of battery 23 in accordance with the current drain imposed upon it by the increment of field current created by rectifier 20. This operation is likewise described in detail hereafter. The control mechanism 18 also feeds controlled A.-C. power to the no-load battery charge compensation rectifier indicated at 24. This rectifier serves—at any speed above a predetermined minimum idling speed of engine 10—to charge the battery 23 in amount somewhat in excess of the no-load battery current drain by the alternator field windings. The principal function of this rectifier is to maintain the battery charge to the extent that no-load field current and other D.-C. battery load drains the battery. The miscellaneous battery load is indicated diagrammatically at 26 and includes, for example, engine starting battery drain, lighting load, and the like.

In addition to the foregoing portions of the overall electrical system, there may be provided an array of braking resistors, indicated generally at 28, which are connectible by the contactor 16d across the output lines of the alternator 14. As shown, these resistors are connected in balanced polyphase circuit. They serve to brake the shaft 12 in dynamic braking action when desired. For example, in the case of a vehicle travelling downhill, the generator 14 may be made to provide dynamic braking action in conjunction with the resistors 28 and thus supplement the action of the vehicle brakes. One of the characteristics of such braking action under the field control provided by the present invention is that a steadily rising torque characteristic is obtained. This is due to the fact that the kilowatt load on alternator 14 when control mechanism 18 is operating and a resistive load 28 is connected varies approximately as the square of the engine speed, since terminal voltage is in proportion to engine speed and kilowatt load is proportional to voltage squared. This is desirable action since for braking purposes it is helpful to have the braking effect increase rapidly as speed rises. Under normal constant voltage regulation, the power dissipated in the resistance load would be essentially independent of speed and dynamic braking torque would decrease with speed.

Figure 3:
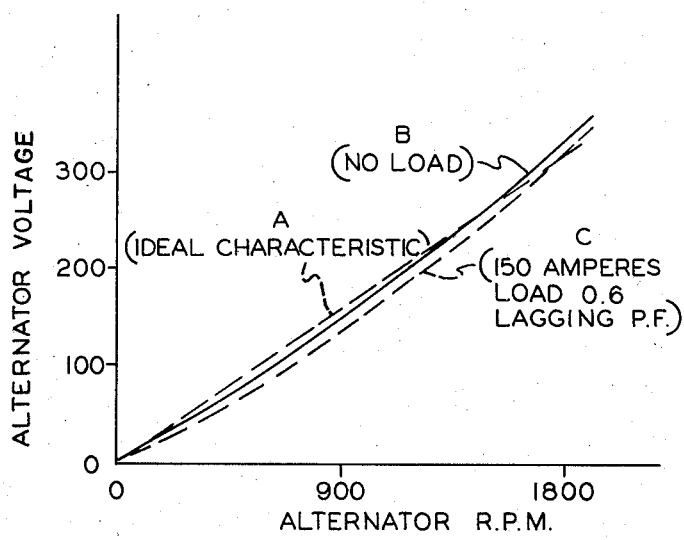
Figure 3 is the alternator speed or frequency-terminal voltage curve for an alternator having a field supply system constructed in accordance with the present invention.
Figure 4:
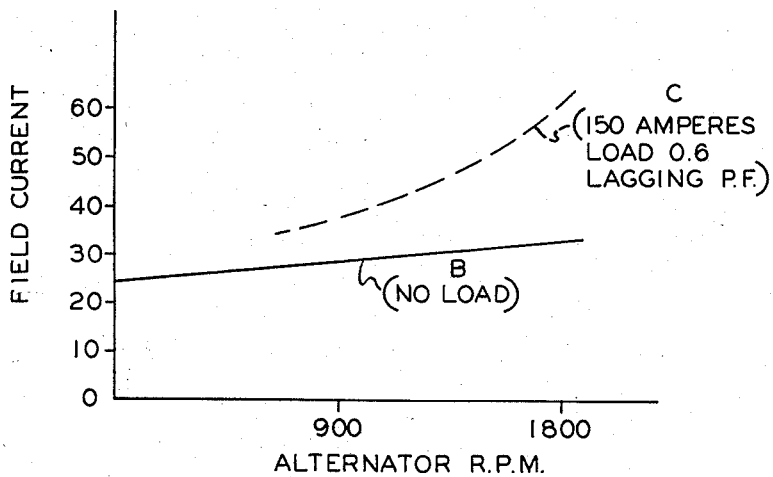
Figure 4 is the alternator speed or frequency-field current characteristic curve for the alternator operation of Figure 3.

The approximate generator output characteristics achieved with the control mechanism 18 are shown in Figures 3 and 4. The desirable or ideal voltage-speed characteristic is indicated at A, Figure 3. This characteristic consists of a linear curve passing through the origin or, in other words, an A.-C. output voltage varying in proportion to the speed of rotation. The actual output voltage characteristic obtained at no load with a system constructed in accordance with the present invention is shown at B. While there is some deviation from the straight line of characteristic A, the deviation is slight and the performance of the alternator 14 with induction motor loads is essentially that desired. When the generator is loaded as shown by curve C, Figure 3, there is further deviation from the straight line desired characteristic. In the case of curve C the load current of 150 amperes is a typical rather heavy load value and the characteristic curve shown is for the most difficult case of low power factor lagging induction motor current flow. Under all conditions the characteristic is essentially that of a constant volts per cycle value.

The rather considerable changes in field current flow required to achieve the characteristics of Figure 3 are shown in Figure 4. The curve B, Figure 4, shows the no load field current variation curve which gave rise to curve B, Figure 3. It will be observed that the field current flow as measured with a D.-C. ammeter current would seem necessary. In the case of the 150 ampere load of curve C, Figure 3, very considerable field current increases were required as shown in curve C, Figure 4. The regulating system hereinafter described in detail gives rise to these rather considerable field current changes as necessary to achieve the desired alternator output voltage characteristic of approximately constant volts per cycle at all practically important load currents and power factors.

THE CONTROL MECHANISM CONSTRUCTION

Figure 2 shows the schematic circuit diagram of the control mechanism 18, Figure 1, together with rectifiers 20, 22 and 24, their interconnections with each other, and their interconnections with the alternator and battery circuits. For purposes of explanation, the various portions of the circuit diagram identified in Figure 1 are similarly identified by dash line boxes in Figure 2.

As shown, the three line terminals 14a, 14b and 14c, across which the polyphase A.-C. voltage is developed, are connected to the three output voltage lines 15a, 15b and 15c, respectively, through the current transformer primary windings 34a, 32a and 30a of the respective transformers 34, 32 and 30. Each of the windings 30a, 32a and 34a is closely coupled in a low leakage reactance conformation to the respective current transformer secondary windings 30b, 32b and 34b so that the latter tend to carry current in phase and magnitude in proportion to alternator load current. These three windings are connected in a Y connection to the A.-C. input current of the three phase rectifier 20 as shown. This connection may be traced from the winding 30b to the common or neutral conductor 36, Figure 2, and from the opposite side of each of the windings 30b, 32b and 34b, through the respective conductors 38, 40 and 42 to the three phase input circuit of rectifier 20.

The rectifier 20 consists of six rectifier elements 44a to 44f, inclusive, connected in a polyphase rectifier circuit to receive A.-C. input voltage from conductors 38, 40 and 42 and to develop D.-C. output voltage across conductors 46 and 48. It will be noted that regardless of the relative polarities of conductors 38, 40 and 42, D.-C. current flow paths from any of them to any other may be traced in the same direction through the D.-C. load terminals 46 and 48. In other words, the rectifier elements 44a to 44f, inclusive, are connected to define a rectifying circuit to convert the A.-C. input power to D.-C. output power.

The transformer indicated generally at 50 has three Y connected primary windings 50a, 50b and 50c, which are respectively fed through the windings 30c and 30d of transformer 30, windings 32c and 32d of the transformer 32 and windings 34c and 34d of transformer 34 as shown. It will be noted that these circuits define Y-connected circuits responsive to the voltage between terminals 14a, 14b and 14c. That is, the circuit may be traced from terminal 14c through windings 30c, 30d and 50a to the common or neutral connection 52; from terminal 14b through windings 32c, 32d and 50b to neutral connection 52; and from terminal 14a through windings 34c, 34d and 50c to the same neutral connection.

As is hereinafter described in detail, the transformer 50 has a flux shunt or bridge indicated diagrammatically at 50d which serves to short circuit the magnetic flux from the three Y-connected secondary windings 50e, 50f and 50g. These windings are physically disposed on the side of the bridge 50d opposite windings 50a, 50b and 50c in the manner described in Charles C. Roe patent 2,547,783 issued April 3, 1951 and assigned to R. G. LeTourneau, Inc. of Stockton, California. As shown, one terminal of each the secondary windings 50e, 50f and 50g is connected to the common or neutral connection 54, whereas the opposite terminals of these windings are, respectively, connected to conductors 56, 58 and 60. The latter conductors are connected to the A.-C. input circuit of the rectifier 24. This rectifier is identified as the no-load battery charge compensation rectifier in Figure 1. It uses the same polyphase rectifying circuit as the rectifier 20 and serves to produce across D.-C. output terminals 62 and 64 a D.-C. voltage determined by the A.-C. polyphase balanced voltage across the A.-C. input conductors 56, 58 and 60. The operation of rectifier 24 and the transformer 50 in supplying charging current through the conductor 62 to the battery 23 under no-load conditions is described in detail hereinafter.

The rectifier 22, Figure 2, is connected in the same polyphase rectifying circuit as rectifier 20 to form A.-C. input conductors 66, 68 and 70 and D.-C. output conductors 72 and 74. This rectifier is indicated as the load battery charge compensation rectifier in Figure 1. It is connected in parallel or battery charging relation to battery 23 to charge the same through conductor 72 in accord with the increment of battery current due to increased field current flow associated with the action of the rectifier 20. The rectifier 22 is energized from the windings 30e, 32e and 34e of the transformers 30, 32 and 34, respectively. These windings are connected in a balanced Y circuit connection as shown. This connection may be traced from the left hand terminal of each of windings 30e, 32e and 34e to the common or neutral conductor 76. It may also be traced from the right hand end of each of windings 30e, 32e and 34e to the conductors 66, 68 and 70, respectively.

In the transformers 30, 32 and 34, the windings 30b and 30c; windings 32b and 32c; and the windings 34b and 34c are in close coupling with respect to each other. That is, these windings have small leakage inductance between them. Similarly, the windings 30e and 30d; the windings 32e and 32d; and the windings 34e and 34d are closely coupled with small leakage inductance. However, the windings 30e and 30d; the windings 32e and 32d; and the windings 34e and 34d are physically spaced along the cores of the respective transformers 30, 32 and 34 in relation to the other windings, particularly windings 30a, 32a and 34a, so that these windings are each loosely coupled to the other windings on each of the cores respectively. In other words, there is a substantial leakage inductance between each of the pairs of windings 30e and 30d, the windings 32e and 32d, and the windings 34e and 34d, and each of the other windings on the cores. The purpose and function of these respective couplings are described in detail hereinafter.

It will be observed that a series circuit may be traced from the ground point 78 through the battery 23 and ammeter 80 to the conductors 62, 72 and 48, all of which are connected together. The circuit may be further traced through the D.-C. output conductors 48 and 46 of rectifier 20 to the terminals 14d and 14e of the field winding 14f of the alternator 14, and thence from terminal 14e to ground. Thus there is a series D.-C. field energizing circuit from battery 23 through the series connected rectifier 20 to the field winding 14f. Also it will be noted that each of the rectifiers 22 and 24 is connected in electrical parallel or battery charging relationship with the battery 23. Accordingly, these rectifiers serve to charge the battery 23 or, alternatively, may be looked upon as supplying current to the field 14f which otherwise would of necessity be supplied by the battery 23.

PRACTICAL OPERATION
No-load conditions

When the alternator 14 is brought up to normal idling speed, the field current flow is principally that associated with the voltage of battery 23. This field current flows through the battery and through rectifier 20 to the field 14f. Since this current flow is in the conducting direction of the rectifier 20, this field current gives rise only to a resistive voltage drop across the rectifier as the alternator approaches normal idling speed. The voltage across the armature terminals 14a, 14b and 14c accordingly rises with speed to cause a substantial relatively constant current flow in the primary windings 50a, 50b and 50c of the flux bridge transformer 50. The circuits for this flow may be traced from the terminals 14a, 14b and 14c, respectively, to the neutral connection 52. In the case of terminal 14c the circuit passes through windings 30c and 30d of the transformer 30 and the winding 50a of transformer 50. Similarly, in the case of terminals 14a and 14b, the circuits to the neutral connection extend through the windings 34c and 34d, and 32c and 32d, respectively, of transformers 34 and 32 and through windings 50c and 50b of the transformer 50. The resultant current flow through windings 50a, 50b and 50c induces voltage in the Y-connected secondary windings 50e, 50f and 50g. This voltage, appearing across the conductors 56, 58 and 60, is applied to the A.-C. input circuit of the rectifier 24. The magnitude of this voltage under no-load conditions is sufficient to charge the battery 23 and to compensate for the current drain thereof associated with the no-load field current of the alternator. Thus, for example, if the no-load field current is 22 amperes the charging current through conductor 62 might be about 26 amperes. This current flow is sufficient not only to supply the discharging current through the field winding 14f but also serves to compensate for battery drain incident to engine starting and auxiliary D.-C. load such as lighting.

The voltage induced in windings 50e, 50f and 50g—and hence the voltage across the three phase conductors 56, 58 and 60—remains substantially constant as the speed of alternator 14 increases. This is due to the current-limiting action of the flux bridge transformer 50, coupled with the constant primary current characteristic of the transformer when operated at constant input volts per cycle. This current limiting action can be visualized by considering the effect of increased secondary current flow in windings 50e, 50f and 50g. Such increase creates increased M. M. F. by each of these windings in opposition to that of windings 50a, 50b and 50c. Such opposing M. M. F. serves to direct a greater proportion of the flux produced by windings 50a, 50b and 50c through the flux bridge 50d. The consequence is that the proportion of the flux which does not link windings 50e, 50f and 50g increases very rapidly as the current flow of conductors 56, 58 and 60 rises. In practical effect, this action serves to cause transformer 50 to act like a current limiting A.-C. source so that under the normal variations in voltage and frequency of the alternator 14, the voltage across conductors 56, 58 and 60 remains at a substantially constant value and the D.-C. output current flow through conductor 62 likewise remains substantially constant.

Under no-load conditions the transformer 50 serves an additional function in causing current flow through the windings 30c, 32c and 34c. Each of these windings forms a reference primary winding for the corresponding secondary, 30b, 32b or 34b. In operation, the current flow through these reference primaries induces corresponding voltage across the respective secondaries 30b, 32b or 34b to provide balanced three phase rectifier input voltage across terminals 38, 40 and 42. The value of this current flow through windings 30b, 32b and 34b is substantially independent of the alternator speed throughout the normal speed range, since the circuit in which these reference primaries are connected is highly inductive and the alternator output is at substantially a constant volts per cycle value. The system is designed to provide an A.-C. voltage value across conductors 38, 40 and 42 sufficient to provide D.-C. output voltage across conductors 46 and 48 substantially equal to the voltage drop at the D.-C. side of the rectifier under no-load alternator operation. This voltage does not serve to increase the field current flow. However, it does maintain the rectifier 20 in a condition of incipient output current flow to produce an immediate increase in D.-C. output voltage when the voltage across the A.-C. input terminals rises above the value due to windings 30c, 32c and 34c.

As is hereinafter described in detail, the reference primary current flow produces an M. M. F. which is vectorially added to the M. M. F of the main primaries 30a, 32a, and 34a to control alternator excitation in response to load current and power factor.

Under no-load conditions, the current flow in the windings 30d, 32d and 34d serves to induce voltages in the Y-connected windings 30e, 32e and 34e. These windings energize the A.-C. input circuit of rectifier 22 through conductors 66, 68 and 70. The effect of this voltage is to condition the rectifier 22 for immediate battery charging current flow through the conductor 72 when the voltage across conductors 66, 68 and 70 increases. That is, under no-load conditions the voltage appearing across the D.-C. output circuit of rectifier 22, if not connected to battery 23, would be essentially the no-load voltage of battery 23. In consequence any increase in A.-C. voltage applied to conductors 66, 68 and 70 immediately gives rise to battery charging action.

With respect to rectifiers 20 and 22, it will be noted that until the A.-C. input voltages reach a predetermined value there is no D.-C. output current. In the case of rectifier 20, this is due to the D.-C. resistance voltage drop associated with the no-load field current flow which makes the positive side of each rectifier element positive in relation to the negative side. In the case of rectifier 22, this is due to the connection through conductor 72 to the substantially fixed voltage of battery 23. For this reason, in the absence of windings 30c, 30d; 32c, 32d; and 34c, 34d, the rectifiers 20 and 22 would have a delayed action as the voltage applied to their respective A.-C. input circuits is increased. The effect of such delayed action would be to disable or decrease the regulating action for comparatively small alternator load currents.

*Load conditions*

As load is applied to the alternator 14, current flows from the line terminals 14a, 14b and 14c through the primary windings 34a, 32a and 30a, respectively, to the load connected to conductors 15a, 15b and 15c (see Figure 1). If the load is principally hoist type high slip induction motors, the current flow through the alternator will have a low value of lagging power factor. For example, the power factor may be 0.6 lagging. The resulting load current flow through each of the windings 30a, 32a and 34a gives rise to a magnetomotive force (M. M. F.) which is substantially in phase with the M. M. F.'s of windings 30c, 32c and 34c This is best shown in the vector diagram of Figure 5. As shown in that figure, the three terminals 14a, 14b and 14c have balanced three phase voltages. The point of neutral voltage defined by the neutral connection 52 to which windings 30c, 32c and 34c are connected is indicated at 52. Since the transformer 50 appears as a low power factor lagging load, the current flow and M. M. F. of the winding 30c, for example, lags the voltage between terminal 14c and the neutral point 52 as shown at OA, Figure 5. A 0.6 lagging power factor is shown for this circuit for purposes of illustration. Since the winding 30a is connected to line terminal 14c, the current flow to the load at unity power factor is in phase with the line to neutral voltage 14c—52. This current flow produces an M. M. F. through the winding 30a which is indicated by the vector AB, Figure 5. The resultant M. M. F. vector OB is the effective M. M. F. which produces flux in the core 30 and induced voltage in winding 30b As is apparent from Figure 5 this total is less than the algebraic sum of the vectors OA and AB.

On the other hand, if the current flow to the load has a low lagging power factor, the M. M. F. in winding 30a lags in relation to the line to neutral voltage as is shown at AB′, Figure 5. For purposes of illustration a 0.6 lagging power factor load current is shown. In this instance the M. M. F. due to load current is substantially in phase with the reference M. M. F. OA due to winding 30c so that the resultant M. M. F. OB′ is substantially the algebraic sum of the two components OA and AB′. The resultant induced voltage in winding 30b is accordingly larger than in the case of unity power factor load. The A.-C. input voltage to rectifier 20 is thus greater for low power factor load than for unity power factor load and the D.-C. output voltage accordingly is increased. In consequence, the alternator field current is increased by the action of transformers 30, 32 and 34 and rectifier 20 to a greater extent at low lagging load power factor than at high lagging power factor.

It is the inherent characteristic of alternators that greater field current is required to maintain predetermined output voltage under low lagging power factor than at unity power factor. The reason for this will be evident from Figures 6a and 6b. In these figures the vector OV represents the alternator terminal voltage and the vector OV′ represents the required excitation voltage. In the case of Figure 6a the load has a low power factor so that the armature resistance drop $IR_a$ is out of phase with the terminal voltage and the armature reactance drop $IX_a$ is more nearly in phase with this voltage. It is accordingly necessary to have a comparatively large excitation voltage OV′ to obtain a predetermined terminal voltage OV. In Figure 6b the same conditions are shown but with a unity power factor load. In this instance the armature reactance drop is out of phase with terminal voltage and the much smaller resistance drop is in phase with terminal voltage. Consequently, the required excitation voltage OV′ is less than with the low power factor load.

It will be noted that by the use of reference M. M. F. obtained by reason of current flow through windings 30c, 32c and 34c, the voltage from transformers 30, 32 and 34 due to load current flow is added vectorially in fashion analogous to that of Figures 6a and 6b, which represent the actual alternator operation. Consequently by the appropriate choice of the M. M. F. in windings 30c, 32c and 34c in relation to the M. M. F. of the windings 30a, 32a and 34a, it is possible to provide alternator voltage which is substantially independent of load power factor, even though the required field current varies greatly with power factor. In a practical construction, for example, the current flow through windings 30c, 32c and 34c at no-load was in the neighborhood of 12 amperes and these windings had 70 turns each to provide approximately 850 ampere turns M. M. F. The windings 30a, 32a and 34a were provided with 9 turns to give about 1800 ampere turns M. M. F. at 200 amperes load, the maximum load value ordinarily encountered. Thus the maximum M. M. F. of the windings 30a, 32a and 34a is approximately twice that of the continuous M. M. F. of the reference windings 30c, 32c and 34c.

It will be observed that as the windings 30a, 32a and 34a contribute M. M. F. and thus induce voltage in windings 30b, 32b and 34b, the voltage across rectifier 20 increases from the reference value associated with current flow in windings 30c, 32c and 34c alone. This is because these reference windings serve not only to provide vector voltage addition but also serve to compensate for the voltage drop in rectifier 20 under no-load conditions. Hence the field current is increased even under comparatively small load current increase.

The windings 30e, 32e and 34e serve to energize rectifier 22 to compensate for battery drain associated with increased field current flow. These windings are loosely coupled to the windings 30a, 32a and 34a, respectively, to provide a substantial degree of leakage reactance. The voltages induced at each of windings 30e, 32e and 34e are the vector sums of those due to the M. M. F.'s of windings 30a, 32a and 34a and the windings 30d, 32d and 34d. The resultant action is as above described with reference to windings 30b, 32b and 34b to energize rectifier 22 in accordance with both the magnitude and phase of the load current flow. However, a comparatively great amount of leakage reactance is provided between windings 30e, 32e and 34e and the respective primaries 30a, 32a and 34a so that the current flow in the former windings is limited by leakage reactance. Also windings 30d, 32d and 34d have a somewhat greater number of turns than the windings 30b, 32b, and 34b. For example, in one construction applicants used 50 turns each in windings 30b, 32b and 34b and 90 turns each in windings 30e, 32e and 34e. Additionally, the windings 30d, 32d and 34d have been constructed with approximately 30 turns so that the M. M. F. due to current flow through these windings is about 350 ampere turns. The effect of these proportions in conjunction with the leakage reactance provided is to maintain the current flow through conductor 72 substantially equal to the increment of field current flow due to the action of rectifier 20, thus maintaining the charge on battery 23 substantially constant, while at the same time preventing excessive currents.

*Effect of alternator speed change*

In the description given above, the alternator 14 is assumed to have been operating at a constant speed of rotation, thus giving rise to a constant frequency of the generated voltage. Under normal operation of the system this speed is not in fact constant. Rather, it may vary over a very substantial range, such as, for example, from about 900 R. P. M. to about 1800 R. P. M., or even more, as the diesel or other engine 10 is accelerated to supply increased mechanical or electrical load. The resultant system frequency may thus vary from about 60 cycles per second to 120 cycles per second or more. These frequency variations, however, produce only slight departures from the operation discussed above.

With respect to the action of the series circuit containing windings 30c, 30d and 50a—and the corresponding circuits through each of the other phases—the entire system appears as nearly a perfect inductance load having a very low power factor as discussed above. The load of rectifier 24 in this circuit (reflected through the transformer 50) does give rise to some real power load, but the in-phase current component is sufficiently low to have no significant effect on the total current flow and operating characteristics. As a consequence, the current flow decreases substantially in proportion to increased frequency and increases in substantial proportion to total voltage. Since under the operation of the system the terminal voltage of the alternator is increased substantially in proportion to frequency it follows that the current flow through this circuit remains substantially constant over variations in system frequency. Thus the M. M. F. contributions of the windings 30c and 30d and the like windings of transformers 32 and 34 remain the same over the normal frequency variations and frequency variations do not alter the system operation.

Insofar as the action of windings 30a, 32a and 34a are concerned, the effect of increased frequency can only alter the current flow and power factor of a particular load. Thus in the case of induction motor loads the variation of current and power factor with frequency is not great, whereas in the case of other loads it may be substantial. In any event the windings 30a, 32a and 34a respond to the actual load current and power factor and it is this actual load current and power factor that influences the action of the alternator 14 and likewise requires compensating field current changes. Thus frequency changes influence windings 30a, 32a and 34a only to the extent that such frequency changes also vary the alternator field current requirements and this is the action desired.

MOTOR OPERATION

As above discussed with reference to Figure 1, it is desirable under some conditions to operate the alternator 14 as a synchronous motor from an external source of polyphase alternating current. As shown in that figure, this may be done by connecting an external power system or source 17 through the contactor 16a to the load conductors 15a, 15b and 15c. Under this operation, the system of Figure 2 serves to energize the field winding of the alternator by rectifying the applied alternating current to boost the action of battery 23 by the rectified voltage of rectifier 20; to charge battery 23 by the action of rectifier 24 and compensate for no-load field current requirements; and to charge battery 23 through rectifier 22 to compensate for the increased field current associated with the boosting action of rectifier 20.

The windings 30c, 30d and 50a, together with the corresponding phase windings of transformers 32, 34 and 50, operate in the same fashion during motor operation as during generator operation. This is because these windings respond to the terminal voltage of the alternator 14. The windings 30a, 32a and 34a, however, carry current flows during motor action which are in reverse sense with respect to the current flow during generator action. Consequently, the M. M. F. generated by winding 30a, for example, during motor operation is 180 degrees out of phase with the M. M. F. under the same conditions of generator operation.

During motor operation the field current is fixed by the action of the field current supply system 18 in conjunction with the alternator current flow characteristics. At any particular value of load torque, the in-phase component of alternator (motor) current is fixed by the kilowatt power demand of the load. The value of the actual field current flow is fixed—due to the action of transformers 30, 32 and 34—at a value which gives rise to that field current. In other words, the field current and armature current flow are mutually controlled by each other—both subject, however, to the condition that the in-phase armature current has the value required to develop the necessary motor power output.

In actual operation the system operates as a synchronous motor with comparatively high power factor under the operation of the field current supply system. This is true whether it is being driven by another like alternator located on another vehicle, or is being driven from an infinitely large power source.

PARALLEL ALTERNATOR OPERATION

It has been additionally found possible to operate the mechanism of Figure 2 as one of a number of alternators in parallel supplying a common load. During the course of such operation the natural speed-drop of the generators serves to avoid instability or hunting as to kilowatt load division. As to reactive load, the system provides some droop in the load-current, load-voltage characteristic to provide a division of such load without instability or hunting.

ALTERNATE CONSTRUCTION

Figures 7 and 8 show an alternative construction of the system of the present invention. In Figure 7 the same reference numerals are applied as in the case of Figure 2, insofar as the parts are identical. In the case of the flux bridge transformer 150, however, the construction is different and here the number 100 has been added to the reference numbers to indicate correspondence with similar parts of the circuit of Figure 2.

In the arrangement of Figure 7 the flux bridge transformer 150 has the similar primary windings 150a, 150b and 150c and a similar neutral connection 152 to that of the corresponding transformer 50, Figure 2. Similarly, the secondary windings 150e, 150f and 150g connect to a neutral conductor 154 to energize the A.-C. side of rectifier 24. However, as shown best in Figure 8, the flux bridge 150d of the transformer of Figures 7 and 8 is constructed in core type fashion with a window 150h to receive the winding 150i. The latter winding is connected in series circuit with the miscellaneous D.-C. battery load 26, such as vehicle lights, heater, horn, etc.

In operation, the winding 150i magnetically saturates the core 150d in accord with the magnitude of the D.-C. load 26. As the load increases the degree of saturation likewise increases and the shunting effect of the core 150d is reduced. The voltages induced in windings 150e, 150f and 150g are accordingly increased.

Viewed differently, the effect of controllably saturating the core 150d in accord with D.-C. load is to increase the value of limiting current flow in the windings 150e, 150f and 150g in accord with that load. This gives corresponding increased D.-C. output current from rectifier 24. In the system of Figures 7 and 8, the size of the core 150d and the number of turns of winding 150i are so adjusted that the increased current output of the rectifier 24 substantially compensates for the effect of increased load current on the battery 23. The system thus serves to maintain the charge on battery 23 not only to compensate for the varying alternating field current requirements but also for the varying D.-C. load requirements.

The D.-C. control circuit of Figures 7 and 8 is described and claimed in the copending application of Charles C. Roe, S. N. 520,502, filed July 7, 1955, entitled "Control Circuit." The transformer 50 of these figures is described and claimed in the copending application of Charles C. Roe, S. N. 520,215, filed July 6, 1955, entitled "Control Transformer." Both applications are assigned to the same assignee as the present invention.

In the constructions above described, the windings 30c, 32c and 34c, Figure 2, and the associated parts are proportioned to produce voltage across transformer 20 substantially equal to the D.-C. voltage drop in rectifier 20 under no-load conditions. In an alternative construction these windings and the associated parts may be proportioned to give a D.-C. battery boosting voltage across rectifier 20 at no-load conditions. For example, in an actual construction an alternator requiring about 32 volts field voltage for no-load full voltage operation has been operated from a battery 23, Figure 2, having about 26 volts. In this instance the winding 30c was proportioned to give—under no-load conditions—a D.-C. boost voltage on the D.-C. side of rectifier 20 equal to about 6 volts.

This operation has a number of advantages. First, the rectifier 20 is conditioned for increased D.-C. voltage upon any load current flow in winding 30a, just as in the case above described where the D.-C. voltage is only that of the no-load rectifier voltage drop. Secondly, the system consisting of the windings 30c, 30d and 50a—and the like windings on the other phases—exhibits a marked constant current characteristic due to the action of transformer 50. Consequently, variations in the resistance of field 14f do not exert as much control over field current flow as otherwise would take place. This is helpful because the temperature of the field 14f increases considerably under prolonged lagging power factor full load operation, with the consequence that if the field current came only from the battery 23, Figure 2, the alternator voltage would be at a lower than normal value when the load is removed. The constant-current tendency of the A.-C. circuit feeding rectifier 20 serves to minimize this effect. Additionally, with rectifier 20 supplying some of the no-load field excitation voltage it is possible to operate at a lower field current value at all loads and this has been found to simplify circuit design and reduce the sizes of the required parts.

When the alternator is operated with some field boosting voltage at no-load, the battery 23 continues to provide initial field excitation and to exert a desirable stabilizing influence on the operation of the system.

It will be noted that, whether the rectifier 20 boosts field voltage somewhat under no-load operation or merely compensates for the D.-C. rectifier voltage drop under no-load conditions, the proportions of the rectifier and transformers 30, 32, 34 and 50 must be arranged to provide D.-C. rectifier output voltage under no-load conditions at least equal to the rectifier D.-C. voltage drop.

If desired, the circuit may be constructed to provide some battery charging current flow from rectifier 22 under no-load conditions. In such instance the no-load charging current from rectifier 24 can be correspondingly reduced. Such no-load current flow from rectifier 22 does not alter the conditioned state of that rectifier for an immediate increase in battery charging current when load current flows. In other words, rectifier 22—like rectifier 20—need only develop a no-load voltage at least equal to the voltage across it under no-load operation in order to respond immediately to alternator load current.

From the foregoing it will be apparent that the apparatus of the present invention serves to maintain the terminal voltage of alternator 14 at an approximately constant volts per cycle under varying conditions of load power factor and frequency; to maintain the battery charge despite the wide variations in required field current flow; and to control the alternator field current for effective operation as a synchronous motor or as a generator in parallel with other generators feeding a common load circuit. Of course, many modifications and alternative constructions may be used to accommodate particular installation conditions, all without departing from the true spirit and scope of the present invention. Such modifications and alternative constructions might be provided to achieve operation with a different number of phases or with a polyphase system wherein only certain phases are used to supply the rectifiers. We therefore intend by the appended claims to cover all such modifications and alternative constructions as fall within the true spirit and scope of the present invention.

What we claim as new and desire to secure by Letters Patent of the United States:

1. A field current supply system for an alternator having a D.-C. field winding and a three phase A.-C. armature winding with three line terminals and in which a substantially constant volts per cycle output value is desired over a range of operating frequencies, load current, and power factor values, the system comprising: battery means to supply predetermined constant no-load field current; a rectifier having a D.-C. output circuit and an A.-C. input circuit; means connecting the D.-C.

output circuit in series with said first means and the alternator field; a first transformer having a secondary winding connected to the A.-C. input circuit of the rectifier and a pair of primary windings; means connecting one primary winding of the transformer to one line terminal to carry A.-C. load current; a second transformer having a primary winding and a secondary winding; means defining a series circuit from said terminal through the other primary winding of the first transformer and the primary winding of the second transformer to a point of neutral potential, whereby current flow through said other primary winding is substantially in phase with current flow in said one primary winding at low lagging power factor load current; second rectifier means having an A.-C. input circuit and a D.-C. output circuit, the D.-C. output circuit being connected in charging relation to the battery and the A.-C. input circuit being connected to the secondary winding of the second transformer to restore the no-load battery drain.

2. A field current supply system for an alternator having a D.-C. field winding and an A.-C. armature winding and in which a substantially constant volts per cycle output value is desired over a range of operating frequency, load current, and power factor values, the system comprising: battery means to supply predetermined constant no-load field current; a rectifier having a D.-C. output circuit and an A.-C. input circuit; means connecting the D.-C. output circuit in series with said first means and the alternator field; a transformer having a secondary winding connected to the A.-C. input circuit of the rectifier and a pair of primary windings; means connecting one primary winding of the transformer to the armature winding to carry A.-C. load current; reactance means connecting to the other primary winding to carry current in accord with armature voltage and substantially in phase with current flow in the one primary winding at low lagging power factor; and rectifier means connected to the reactance means to restore the no-load battery discharging current flow.

3. A field current supply system for an alternator having a field winding and a three-phase A.-C. armature winding, the system comprising: a plurality of transformers each having a pair of primary windings and a secondary winding; a rectifier having a three phase A.-C. input circuit and a D.-C. output circuit; a battery connected to supply field winding current; means connecting the rectifier D.-C. output circuit to the battery in charging relation therewith; means connecting the rectifier A.-C. input circuit to the secondaries of the transformers; means connecting one primary winding of each transformer in circuit with the armature to carry the respective line currents to a load; and means connecting the other primary of each transformer to the neutral point through a reactive circuit, whereby the rectifier current varies in accord with both the magnitude and the power factor of the armature load current, said last means being proportioned to draw current flow sufficient to provide rectifier output voltage under no-load alternator conditions at least equal to the battery voltage under no-load alternator operation and thereby condition the rectifier for immediate conduction upon application of load current.

4. A field current supply system for an alternator having a field winding and a three phase A.-C. armature winding, the system comprising: a plurality of transformers each having a pair of primary windings and a secondary winding; a rectifier having a three phase A.-C. input circuit and a D.-C. output circuit; means connecting the D.-C. output circuit to the field winding to cause current flow therethrough in accordance with the voltage at the A.-C. input circuit; means connecting the A.-C. input circuit to the secondaries of the transformers; means connecting one primary winding of each transformer in circuit with the armature to carry the respective line currents to a load; and means connecting the other primary of each transformer to the neutral point through an inductive circuit, whereby the field current varies in accord with both the magnitude and the power factor of the armature load current, said last means being proportioned to provide D.-C. voltage at least equal to the voltage drop of the rectifier under no-load conditions and thereby condition the rectifier for immediate conduction upon application of load current.

5. A field current supply system for an alternator having a field winding and a three phase A.-C. armature winding, the mechanism comprising: a plurality of transformers each having a pair of primary windings and a secondary winding; a rectifier having a three phase A.-C. input circuit and a D.-C. output circuit; means connecting the D.-C. output circuit to the field winding to cause current flow therethrough in accordance with the voltage at the A.-C. input circuit; means connecting the A.-C. input circuit to the secondaries of the transformers; means connecting one primary winding of each transformer in circuit with the armature to carry the respective line currents to a load; and means connecting the other primary of each transformer to a neutral point through an inductive circuit, whereby the field current varies in accord with both the magnitude and the power factor of the armature load current.

6. A field current supply system for an alternator having a field winding and an A.-C. armature winding and operable over a range of speeds at a substantially constant volts per cycle value, the mechanism comprising: battery means to supply predetermined no-load field current; a pair of rectifiers each having a D.-C. output circuit and an A.-C. input circuit; means connecting the D.-C. output of one of said rectifiers in battery charging relation to the battery and the D.-C. output circuit of the other rectifier in boosting relation with the battery to vary the current flow through the field; transformer means connected to the A.-C. input circuit of each rectifier; first means to induce voltage in each transformer means in accord with armature current flow to increase the rectified current as load current rises; and second means to induce voltage in each transformer means in accord with armature voltage to overcome the no-load voltages across the D.-C. circuits of the rectifiers to condition the same for immediate conduction upon application of load current, the voltages of the second means being substantially in phase with the voltages of the first means under low lagging power factor alternator load current flow.

7. A field current supply system for an alternator having a field winding and an A.-C. armature winding and operable over a range of speeds at a substantially constant volts per cycle value, the mechanism comprising: battery means to supply predetermined no-load field current; a pair of rectifiers each having a D.-C. output circuit and an A.-C. input circuit; means connecting the D.-C. output of one of said rectifiers in battery charging relation to the battery and the D.-C. output circuit of the other rectifier in boosting relation with the battery to vary the current flow through the field; transformer means connected to the A.-C. input circuit of each rectifier; means to induce voltage in each transformer means in accord with armature current flow to increase the rectified current as load current rises; and means to induce voltages in each transformer means in accord with armature voltage and in amount at least sufficient to overcome the no-load voltages across the D.-C. circuits of the rectifiers and condition the same for immediate increased D.-C. current upon application of load current.

8. A field current battery discharge compensating system for an alternator having a field winding, an A.-C. armature winding, and a battery connected to supply no-load field current, the system comprising: rectifier means having a D.-C. output circuit in charging relation to the battery and an A.-C. input circuit; means to supply A.-C.

voltage from the alternator to the rectifier means, thereby developing D.-C. rectified voltage in the output circuit, said A.-C. voltage being of value to develop D.-C. rectified voltage of value substantially equal to the battery voltage under no-load conditions; and means to supply increased A.-C. voltage to the rectifier to increase the D.-C. battery charging current in direct relation to increased alternator load current.

9. A field current battery discharge compensating system for an alternator having a field winding, an A.-C. armature winding, and a battery connected to supply no-load field current, the system comprising: current transformer means having a first primary winding connected to the A.-C. armature winding to carry load current therefrom, a second primary winding, and a secondary winding; rectifier means having a D.-C. output circuit in charging relation to the battery and an A.-C. input circuit connected to said secondary winding, whereby the battery charging D.-C. output current flow is increased in response to alternator load current; and means connecting the second primary winding across the armature winding to induce voltage in the secondary winding of amount sufficient to provide rectified voltage in the D.-C. output circuit at least substantially equal to the battery voltage under no-load conditions to condition the rectifier for immediate increased current flow upon application of load.

10. A field current battery discharge compensating system for an alternator having a field winding, an A.-C. armature winding, and a battery connected to supply no-load field current flow, the system comprising: rectifier means having a D.-C. output circuit connected in charging relation with the battery and an A.-C. input circuit; a transformer having a secondary and two primary windings; means to energize the rectifier means from the secondary winding; means connecting one primary winding to the A.-C. armature winding to carry load current therefrom; and means connecting the other primary winding across the A.-C. armature winding to carry current substantially in phase with the current flow in the one primary winding under low lagging power factor load and in amount to provide rectified voltage in the D.-C. output circuit at least substantially equal to the battery voltage under no-load conditions to condition the rectifier for immediate conduction upon application of load.

11. A field current supply system for an alternator having a field winding and an A.-C. armature winding, the system comprising: means to supply predetermined no-load field current; rectifier means having a D.-C. output circuit in series with said first means and an A.-C. input circuit; a transformer having a secondary and two primary windings; means to energize the A.-C. input circuit of the rectifier means from the secondary winding; means connecting one primary winding to the A.-C. armature winding to carry load current therefrom; and means connecting the other primary winding across the A.-C. armature winding to carry current substantially in phase with the current flow in the one primary winding under low lagging power factor load and in amount at least sufficient to compensate for rectifier voltage drop under no-load field current flow and thereby condition the rectifier for immediate conduction upon application of load.

12. A field current supply system for an alternator having a field winding and an A.-C. armature winding, the system comprising: means to supply predetermined no-load field current; current transformer means having a first primary winding connected to the A.-C. armature winding to carry load current therefrom, a second primary winding, and a secondary winding; rectifier means having a D.-C. output circuit in series with said first means and an A.-C. input circuit connected to said secondary winding, whereby field current flow is increased in response to alternator load current; and means connecting the second primary winding across the armature winding to induce voltage in the secondary winding of amount at least sufficient to compensate for the voltage drop through the rectifier associated with no-load field current flow and thereby condition the rectifier for immediate conduction upon application of load.

13. A field current supply system for an alternator having a field winding and an A.-C. armature winding, and in which a constant volts per cycle voltage is to be generated at varying speed and load power factor, the system comprising: means to supply predetermined no-load field current; current transformer means having a primary winding connected to the A.-C armature winding to carry load current therefrom and a secondary winding; rectifier means having a D.-C. output circuit in series with said first means and an A.-C. input circuit connected to said secondary winding; a second primary winding on said transformer; and inductive reactance means to impress alternating current flow independent of alternator load current upon said second primary winding in amount at least sufficient to compensate for the voltage drop through the rectifier associated with no-load field current flow and thereby condition the rectifier for immediate conduction upon application of load.

14. A field current supply system for an alternator having a field winding and an A.-C. armature winding, the system comprising: means to supply predetermined no-load field current; a rectifier means having a D.-C. output circuit in series with said first means and an A.-C. input circuit; means to supply A.-C. voltage from the alternator to the rectifier means, thereby developing D.-C. rectified voltage in the output circuit, said A.-C. voltage being of value to develop D.-C. rectified voltage of value at least substantially equal to the voltage drop in the D.-C. output circuit associated with flow of said no-load field current; and means to supply increased A.-C. voltage to the rectifier to increase the D.-C. field current in direct relation to increased alternator load current.

15. A field current supply system for an alternator having a field winding and an A.-C. armature winding, the system comprising: means to supply predetermined no-load field current; rectifier means having a D.-C. output circuit in series with said first means and an A.-C. input circuit; means to supply A.-C. voltage to the input circuit of said rectifier means in accord with the current flow in the armature to increase the field current flow upon increase in A.-C. load current; and means operable independently of load current flow to produce initial voltage across the A.-C. input circuit of the rectifier and of magnitude to compensate for rectifier voltage drop at no-load field current to condition the rectifier for immediate conduction upon application of load.

16. An A.-C. self-excited electrical system for a vehicle or the like where automatic operation of an engine connected generator is desired both with respect to delivering power to and taking power from load circuit conductors, the generator having a field winding and an armature winding, the system comprising: a battery connected to supply predetermined no-load generator field current; rectifier means having an A.-C. input circuit and a D.-C. circuit, the D.-C. output circuit being in series booster relation to the battery to increase field current flow as the rectifier D.-C. output increases; a transformer having a secondary winding connected to energize the A.-C. input circuit of the rectifier and a pair of primary windings; means connecting one of the primary windings between the armature winding and the load circuit conductors to respond to load current flow; and means connecting the other primary winding across the armature winding and through a reactance to carry current independent of armature current flow and substantially in phase with the current flow in the one primary winding under low lagging power factor generator action.

17. An A.-C. self-excited electrical system for a vehicle or the like where automatic operation of an engine connected generator is desired both with respect to delivering power to and taking power from load circuit conductors, the generator having a field winding and an armature winding, the system comprising: a battery connected to supply predetermined no-load generator field current; rectifier means having an A.-C. input circuit and a D.-C. output circuit, the D.-C. output circuit being in series booster relation to the battery to increase field current flow as the rectifier D.-C. output increases; means to apply A.-C. voltage to the A.-C. input circuit of the rectifier in accord with current flow between the armature and the load circuit; and means to supply conditioning A.-C. voltage to the A.-C. input circuit of the rectifier independently of armature current flow and in amount sufficient to condition the rectifier for immediate conduction under no-load generator conditions and upon increased voltage in the A.-C. input circuit to the rectifier.

18. An A.-C. self-excited electrical system for a vehicle or the like where automatic operation of an engine connected generator is desired both with respect to delivering power to and taking power from load circuit conductors, the generator having a field winding and an armature winding, the system comprising: a battery connected to supply predetermined no-load generator field current; rectifier means having an A.-C. input circuit and a D.-C. output circuit, the D.-C. output circuit being in series booster relation to the battery to increase field current flow as the rectifier D.-C. output increases; a transformer having a secondary winding connected to energize the A.-C. input circuit of the rectifier and a pair of primary windings; means connecting one of the primary windings between the armature winding and the load circuit conductors to respond to load current flow; and means connecting the other primary winding across the armature winding and through a reactance to carry current independent of armature current flow and substantially in phase with the current flow in the one primary winding under low lagging power factor generator operation, the magnitude of said last current being sufficient to condition the rectifier for immediate conduction upon increased induced voltage in the secondary winding.

19. A field current supply system for an alternator having a field winding and an A.-C. armature winding, the system comprising: means to supply predetermined field current; rectifier means having a D.-C. output circuit in series with said first means and an A.-C. input circuit; means to supply A.-C. voltage to the input circuit of said rectifier means in accord with the current flow in the armature to increase the field current flow upon increase in A.-C. load current; and means operable independently of load current flow to produce initial voltage across the A.-C. input circuit of the rectifier and of magnitude to provide some D.-C. field current boost at no-load field current to provide a predetermined no-load voltage and to condition the rectifier for immediate conduction upon application of load.

References Cited in the file of this patent

UNITED STATES PATENTS

| 2,531,602 | LeTourneau | Nov. 21, 1950 |
| 2,761,097 | LeTourneau | Aug. 28, 1956 |

UNITED STATES PATENT OFFICE

CERTIFICATE OF CORRECTION

Patent No. 2,844,783

July 22, 1958

James I. Chandler et al.

It is hereby certified that error appears in the printed specification of the above numbered patent requiring correction and that the said Letters Patent should read as corrected below.

Column 1, line 33, for "horespower" read -- horsepower --; column 4, line 5, for "longiudinal" read -- longitudinal --; column 6, line 23, after "ammeter" insert -- gradually increases, even though in theory no increased field --; column 13, line 2, for "speed-drop" read -- speed-droop --; column 18, line 62, for "a D.-C. circuit," read -- a D.-C. output circuit,--.

Signed and sealed this 21st day of October 1958.

(SEAL)
Attest:

KARL H. AXLINE
Attesting Officer

ROBERT C. WATSON
Commissioner of Patents